(12) United States Patent
McCrae et al.

(10) Patent No.: US 7,908,610 B2
(45) Date of Patent: Mar. 15, 2011

(54) MULTI-THREADED BUSINESS PROGRAMMING LIBRARY

(75) Inventors: Dean Charles McCrae, Kastrup (DK); Torben Wind Meyhoff, Frederikssund (DK); Lars-Bo Christiansen, Morud (DK); Tsvi M. Reiter, Redmond, WA (US); Uno Junghans, Hellerup (DK)

(73) Assignee: Microsoft Corporation, Redmond, WA (US)

( * ) Notice: Subject to any disclaimer, the term of this patent is extended or adjusted under 35 U.S.C. 154(b) by 887 days.

(21) Appl. No.: 11/831,018

(22) Filed: Jul. 31, 2007

(65) Prior Publication Data

US 2009/0037197 A1 Feb. 5, 2009

(51) Int. Cl.
*G06F 3/00* (2006.01)
(52) U.S. Cl. ...................................... 719/328
(58) Field of Classification Search .................. 719/328
See application file for complete search history.

(56) References Cited

U.S. PATENT DOCUMENTS

| | | | |
|---|---|---|---|
| 5,946,694 | A | 8/1999 | Copeland et al. |
| 6,968,535 | B2 | 11/2005 | Stelting et al. |
| 7,165,060 | B2 | 1/2007 | Foster et al. |
| 2003/0074401 | A1 | 4/2003 | Connell et al. |
| 2004/0123302 | A1 | 6/2004 | Lo et al. |
| 2004/0148185 | A1 | 7/2004 | Sadiq |
| 2004/0177360 | A1 | 9/2004 | Beisiegel et al. |
| 2004/0181771 | A1 | 9/2004 | Anonsen et al. |
| 2006/0059107 | A1 | 3/2006 | Elmore et al. |
| 2006/0085243 | A1 | 4/2006 | Cooper et al. |
| 2006/0143193 | A1 | 6/2006 | Thakkar et al. |
| 2007/0011126 | A1 | 1/2007 | Conner et al. |
| 2007/0061780 | A1 | 3/2007 | Pokluda et al. |
| 2007/0088798 | A1 | 4/2007 | Merrill et al. |

FOREIGN PATENT DOCUMENTS

| | | | |
|---|---|---|---|
| KR | 20010038054 A | 5/2001 | |
| KR | 20050099280 A | 10/2005 | |

OTHER PUBLICATIONS

Written Opinion for PCT/US2008/067909 mailed Jan. 12, 2009.
International Search Report for PCT/US2008/067909 mailed Jan. 12, 2009.
Link et al., "Architecture of and Migration to SOA's Presentation Layer," cm-tm.uka.de/CM-Web/07.Publikationen/%5BLJ+06%5D_Architecture_of_and_Migration_to_SOA_s_Presentati on_Layer.pdf.
Bohrer et al., "Business Process Components for Distributed Object Applications," Communications of the ACM, Jun. 1998, vol. 41, No. 6, delivery.acm.org/10.1145/280000/276618/p43-bohrer.pdf?key1=276618&key2=2588319711&coll=Portal&dl=GUIDE&CFID=17286036&CFT OKEN=40030580.

*Primary Examiner* — Lechi Truong
(74) *Attorney, Agent, or Firm* — Marshall, Gerstein & Borun LLP

(57) ABSTRACT

A business programming library for use by an enterprise resource planning system provides a run-time environment and a library of API services for accessing common data types and business methods, accessing table and form meta-data, and database administration and retrieval/modification. The library provides the ability to safely call into exposed services using multiple threads, and also provides indirect and executable permission checking for increasing system security.

17 Claims, 6 Drawing Sheets

MULTI-THREADED BUSINESS PROGRAMMING LIBRARY

BACKGROUND

Enterprise resource planning systems (ERP) are becoming more public in order to open up the developer experience for creating customized applications and to expand and enrich the user experience. Consequentially, the architectures of ERPs are shifting to accommodate these changes by enabling an ERP to support multiple languages, database technologies and business frameworks.

An architectural shift, however, must find a way to preserve the substantial investment in the product by both the ERP system provider and ERP client so that the existing systems and applications are not rendered obsolete. The architectural shift needs to minimize the investment in time and/or cost during upgrading, and also needs to provide a platform on which to build for future changes, such as transitioning to additional multiple languages and/or business frameworks. Resulting security issues and performance may also need to be addressed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A business programming library is disclosed for use in an enterprise resource planning system (ERP). The architecture of the library may be robust enough to support multiple future generations of languages, database technologies, and business frameworks. The library may serve several purposes in the enterprise resource planning system. It may serve as a class library of application program interfaces (APIs) for accessing common data types and business method functions used by components of the ERP to service client requests. The library may serve as a run-time environment for ERP compilers to emit required run-time calls. It may serve as a database access mechanism for components of the ERP to interface with ERP data. It may provide metadata such as tables, forms, form personalization and the like. And, it may provide administrative functions for the ERP database. In this fashion, these services may be consolidated in the library, thus providing a centralized place for managing types, methods, database information and access. By collecting these services into a centralized library and implementing them as APIs, data access may be aggregated in a single location and not throughout the ERP thus mitigating the cost and inconvenience of changes. Adding a future generation of language or framework may also be addressed in a cost-effective manner by the presence of a centralized library. Additionally, the existing client interfaces to data access may be able to be served by the business programming library with minimal changes and their investment may be protected.

The enterprise resource system in which the business programming library operates may have an internet interface for clients (end user or developers) to access the ERP system, a service tier that acts like a hub to service requests, a metadata provider, a database that may or may not be relational, and business application objects that may have been created by client developers to customize applications for their company. These components may or may not be on the same computer(s) or server(s). The service tier, the metadata provider, and the business application objects may be patrons of the business programming library, although other components may also patronize the library via similar interfaces.

The architecture of the business programming library may group APIs corresponding to types of library services. A patron of the library may invoke the API(s) corresponding to the necessary library service(s) needed to perform its task. Business logic invocation services may consist of business methods that operate on classes of the ERP, such as but not limited to a base class, a table class, a codeunit class, and other utilized classes. Database access services may consist of reading, modifying, inserting, and deleting. Database administration services may contain functions such as but not limited to server configuration, database backup, database restore, database test, and database optimization. Metadata exposure functions may expose tables, forms, and other metadata to the ERP. And, common data types, such as but not limited to Boolean, integer, date, GUID, character string, etc., may be accessible via the business programming library. The library may also be enabled to provide an interface for an administrator, a component of ERP, or some other process to add, delete, and modify the library groups and their contents.

The business programming library may be capable of multi-thread access into the database of the ERP. Resources, or objects of the database on which the APIs of the library operate, may be managed by the library based on whether or not they are required for the entire lifetime of a connection. The library may allow more than one thread to invoke APIs and access resources in a non-sequential fashion.

The business programming library also may provide a layer of security permission checking. The security permissions may be established based upon licensing agreements and customer-defined permissions. Indirect and executable permission checking may be performed when a patron of the library, typically but not limited to the service tier or a business application object, invokes an API. The security permission checking in combination with full security checks at the service tier may centralize security checking on the ERP system server side and therefore increase the strength of security.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . ." or a similar sentence, there is no intent to limit the meaning of that term, either expressly or by implication beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
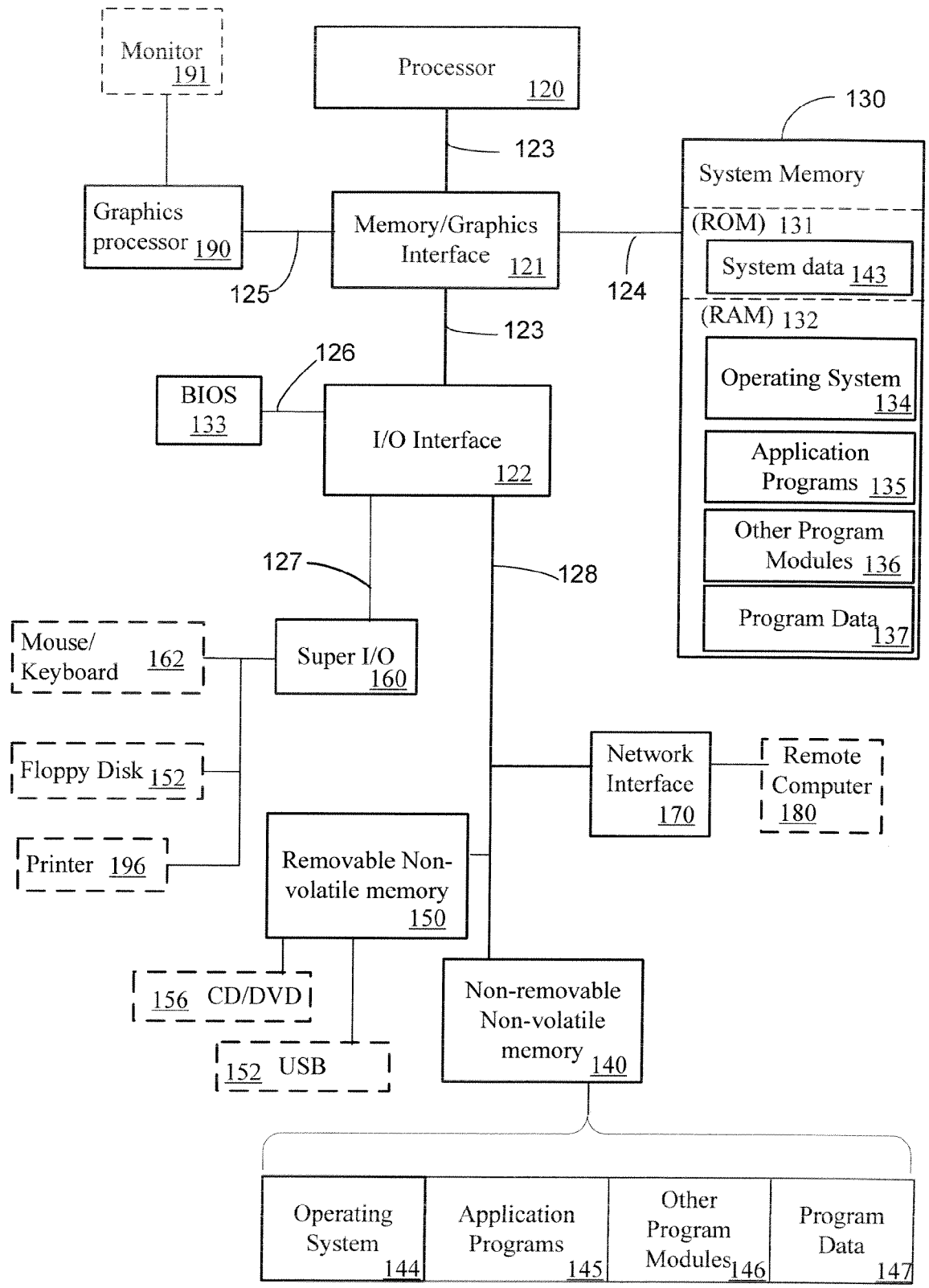
FIG. 1 illustrates a block diagram of an exemplary computing system that may operate in accordance with the claims.

With reference to FIG. 1, an exemplary system for implementing the claimed method and apparatus includes a general purpose computing device in the form of a computer 110. Components shown in dashed outline are not technically part of the computer 110, but are used to illustrate the exemplary embodiment of FIG. 1. Components of computer 110 may include, but are not limited to, a processor 120, a system memory 130, a memory/graphics interface 121, also known as a Northbridge chip, and an I/O interface 122, also known as a Southbridge chip. The system memory 130 and a graphics processor 190 may be coupled to the memory/graphics interface 121. A monitor 191 or other graphic output device may be coupled to the graphics processor 190.

A series of system busses may couple various system components including a high speed system bus 123 between the processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 123 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport architecture, respectively.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. The system ROM 131 may contain permanent system data 143, such as identifying and manufacturing information. In some embodiments, a basic input/output system (BIOS) may also be stored in system ROM 131. RAM 132 typically contains data and/or program modules that are immediately accessible to and/or presently being operated on by processor 120. By way of example, and not limitation, FIG. 1 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 126 may connect to a basic input/output system (BIOS) memory 133 containing the basic routines that help to transfer information between elements within computer 110, such as during start-up.

A super input/output chip 160 may be used to connect to a number of 'legacy' peripherals such as floppy disk 152, keyboard/mouse 162, and printer 196, as examples. The super I/O chip 122 may be connected to the I/O interface 121 with a low pin count (LPC) bus, in some embodiments. The super I/O chip 121 is widely available in the commercial marketplace.

In one embodiment, bus 128 may be a Peripheral Component Interconnect (PCI) bus, or a variation thereof, may be used to connect higher speed peripherals to the I/O interface 122. A PCI bus may also be known as a Mezzanine bus. Variations of the PCI bus include the Peripheral Component Interconnect-Express (PCI-E) and the Peripheral Component Interconnect—Extended (PCI-X) busses, the former having a serial interface and the latter being a backward compatible parallel interface. In other embodiments, bus 128 may be an advanced technology attachment (ATA) bus, in the form of a serial ATA bus (SATA) or parallel ATA (PATA).

The computer 110 may also include other removable/non-removable, volatile/nonvolatile computer storage media. By way of example only, FIG. 1 illustrates a hard disk drive 140 that reads from or writes to non-removable, nonvolatile magnetic media. Removable media, such as a universal serial bus (USB) memory 152 or CD/DVD drive 156 may be connected to the PCI bus 128 directly or through an interface 150. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 1, provide storage of computer readable instructions, data structures, program modules and other data for the computer 110. In FIG. 1, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a mouse/keyboard 162 or other input device combination. Other input devices (not shown) may include a microphone, joystick, game pad, satellite dish, scanner, or the like. These and other input devices are often connected to the processing unit 120 through one of the I/O interface busses, such as the SPI 126, the LPC 127, or the PCI 128, but other busses may be used. In some embodiments, other devices may be coupled to parallel ports, infrared interfaces, game ports, and the like (not depicted), via the super I/O chip 160.

The computer 110 may operate in a networked environment using logical connections to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection between the NIC 170 and the remote computer 180 depicted in FIG. 1 may include a local area network (LAN), a wide area network (WAN), or both, but may also include other networks. Such networking environments are commonplace in offices, enterprise-wide computer networks, intranets, and the Internet.

In some embodiments, the network interface may use a modem (not depicted) when a broadband connection is not available or is not used. It will be appreciated that the network connection shown is exemplary and other means of establishing a communications link between the computers may be used.

Figure 2:
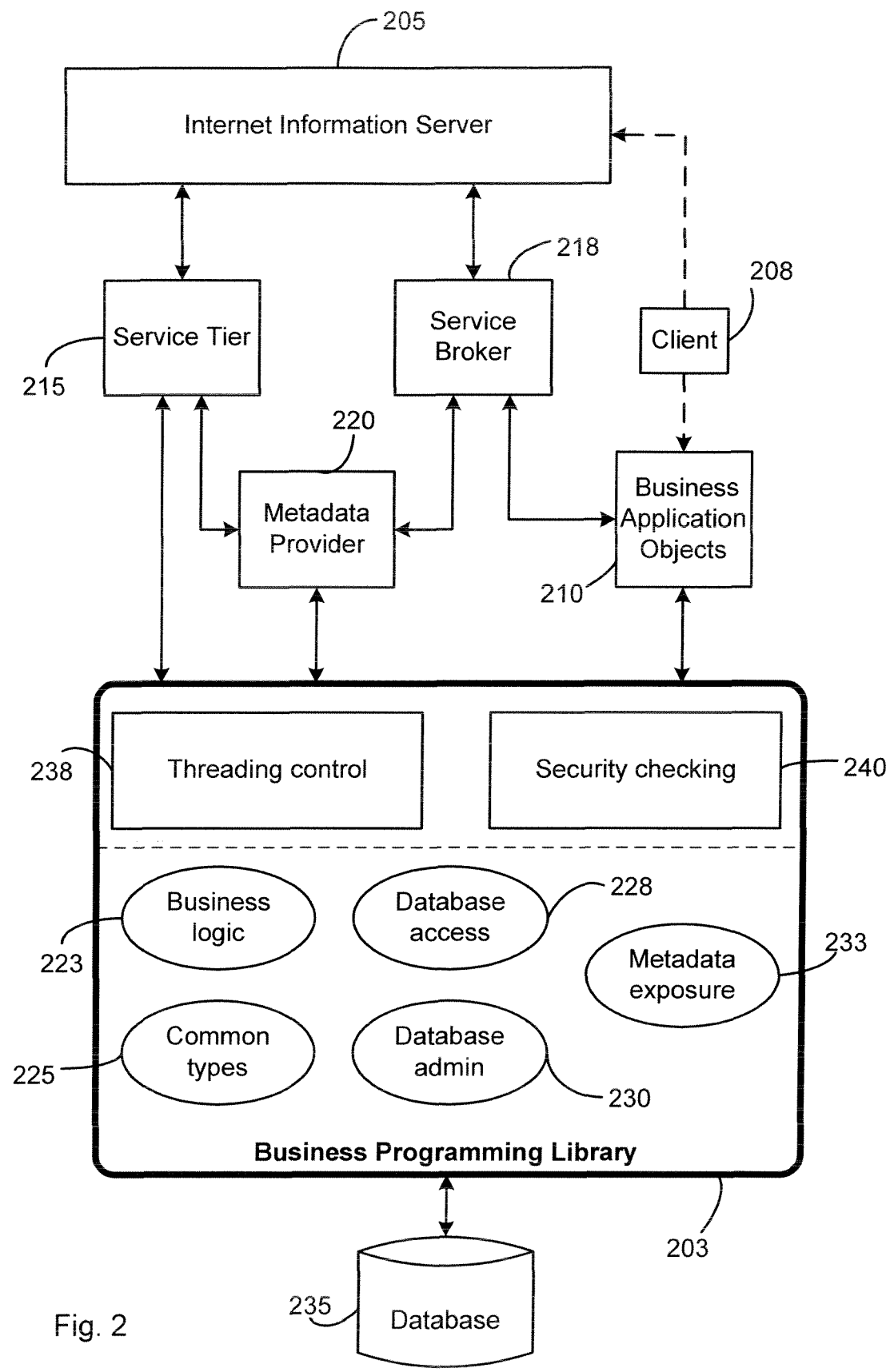
FIG. 2 illustrates an exemplary enterprise resource planning system and how the business programming library fits into the system.

FIG. 2 illustrates an exemplary enterprise resource planning system environment 200 in which a business programming library 203 may exist. The enterprise resource planning system (ERP) 200 may consist of an internet information server (IIS) 205 for hosting the ERP's web services. The IIS (205) may serve as the interface of the ERP service to one or more clients 208. Clients 208 may be end users of the ERP system 200 or they may be developers who may create custom business application objects 210 using the ERP system 200 platform. Business application objects 210 may consist of managed, unmanaged code, or any combination thereof. The ERP services may be coordinated and managed by a service tier 215 that may act like a hub to service requests from clients 208 via the IIS 205. The service broker 218 may be an entity that may allow client developers 208 to use the ERP development environment via the IIS 205 for building and customizing web services. The business application objects 210 may also interface directly with the service broker 218 for customization. A metadata provider 220 may be responsible for providing the metadata required by the service tier 215 and the service broker 218, such as but not limited to forms, form personalization and tables. The service tier 215, the metadata provider 220, and the business application objects 210 may have direct interfaces to the business programming library 203. Although not shown in FIG. 2, other components of an enterprise resource planning system environment 200 may be present in the ERP 200, and those components may also have interfaces to the business programming library 203.

The business programming library 203 may provide a runtime environment for ERP compilers to emit the required run-time code. The library 203 may not contain the actual data for the ERP (e.g., tables, forms, methods, and the like) but may contain a set of application program interfaces (APIs) 223, 225, 228, 230, 233 corresponding to a set of library services for patrons to use for accessing the data. The data itself may be stored in one or more ERP databases 235 which may or may not be relational. Patrons of the library 210, 215, 218 may invoke the API of the necessary library service 223, 225, 228, 230, 233 in order to service client requests.

A discussion of concepts in the enterprise resource planning system 200 follows to assist in providing context for the business programming library 203. A new connection may be made from a client 208 via the IIS 205 to execute a series of operations in the system 200. The service tier 215 may create a connection object for this IIS session and may assign a thread to it. At any point in time, there may be one and only one thread associated with a connection. Throughout the lifetime of a connection, various application objects may be invoked to perform tasks. The application objects may be created by a third party developer 210 or they may be part of the service tier 215. While in use, an application object may be associated to a connection, a thread, and security data. To perform its task, the application object may patronize the library 203 by invoking the metadata provider 220 and any necessary APIs 223, 225, 228, 230, 233 to create, delete or modify forms, tables, records, and other such resources of the database 235.

Thus, the library 203 may serve as a runtime class library API for accessing data types and business logic method functions. The library 203 may be public or it may not be public. The set of business logic library service APIs 223 may contain APIs for one or more business methods on a class of the ERP, where a class may be a table class, a codeunit class, or a base class. Other classes may also be possible. The set of business methods may be supported by the business logic library service APIs 223. Likewise, the sets of common types 225 may be accessed via the business programming library 203. An exhaustive list of possible business methods and common types are commonly known by those familiar in the art of ERP systems and is not covered by this patent application.

The set of APIs corresponding to database access library services 228 in the library 203 may contain APIs for one or more database functions such as but not limited to retrieval, modification, insertion, and deletion. The set of APIs corresponding to database administration 230 may contain APIs for one or more administration functions such as but not limited to server configuration, backup, restore, test, and optimization. The set of APIs corresponding to metadata exposure library services 233 may provide APIs for library patrons to obtain tables, forms, and other metadata for use in servicing a client request.

The business programming library 203 may also provide multi-threaded access control 238 to the library 203. A thread may be assigned and managed by the ERP 200 to track a client request through the execution of the (potentially) multiple steps needed to complete the request. The threading control 238 of the library 203 may allow multiple threads to access APIs for library services (and thus the database 235) in a non-sequential fashion. Details of multi-threaded access control 238 is more fully described in a later section.

Security checking 240 may also be performed by the business programming library 203, specifically indirect and executable permission checking. Security permissions, whether indirect or executable, may be established based upon licensing agreements and customer-defined permissions. When an API for a library service 223, 225, 228, 230, 233 is invoked by a patron 210, 215, 220, indirect and executable permissions associated with invoker of the API and/or the database object of the service may be verified to determine whether or not to allow access to the database. The security checking method 240 is more fully described in a later section.

Each component of the exemplary ERP system 200 of FIG. 2 may reside on a computer or a server that may take the form of computer 110. Multiple components may reside on a single computer or server, some may reside on one server and some on another, or other combinations may be possible. Multiple instances of one component, for instance the database 235, may be possible.

Figure 3:
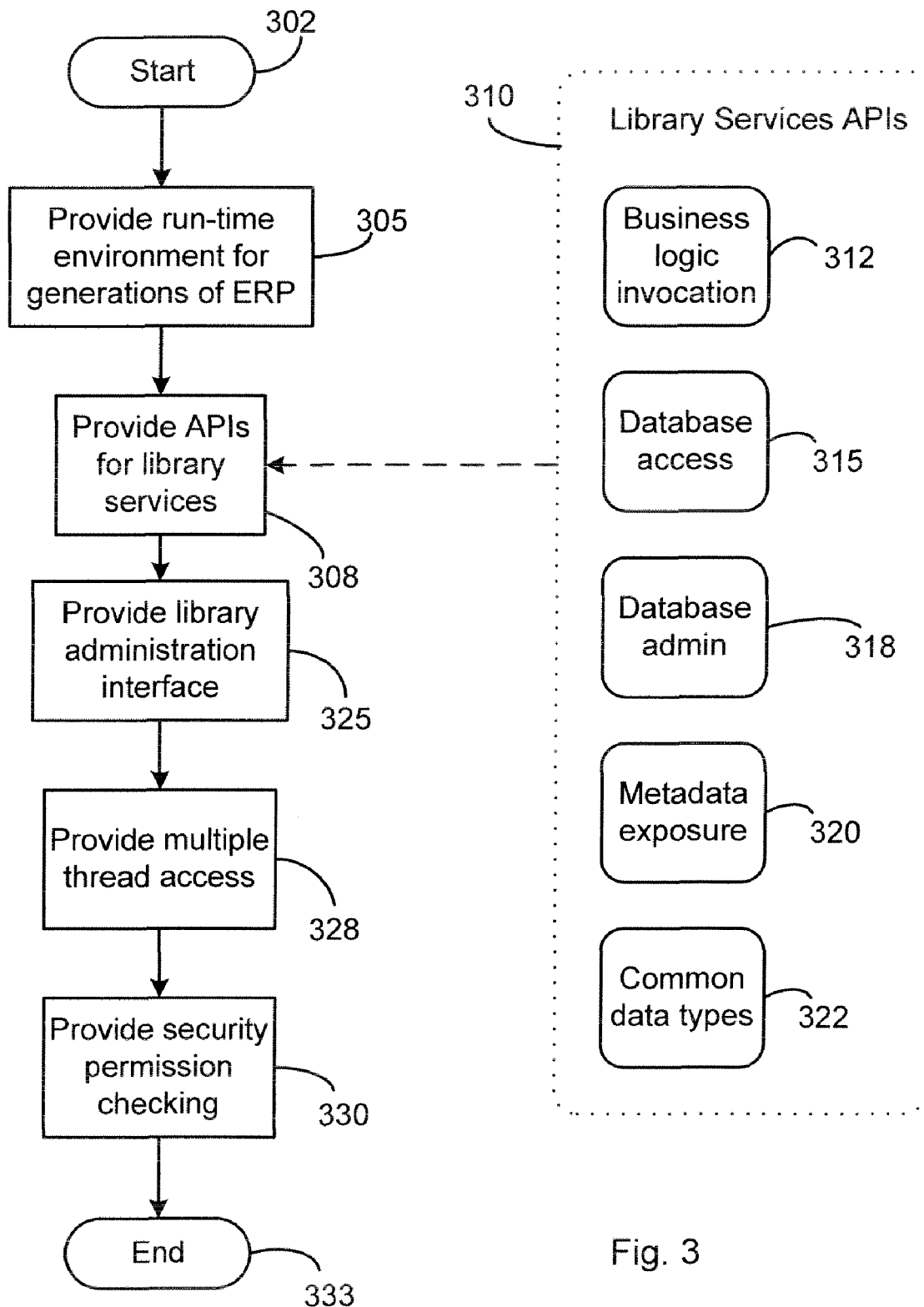
FIG. 3 illustrates an embodiment of a process for enabling a business programming library.

FIG. 3 illustrates an exemplary method 300 of enabling a business programming library for use by an enterprise resource planning system, such as the library 203 and the ERP system 200 of FIG. 2. At the start 302, the library provides a run-time environment 305 for the ERP system. The library may also provide a run-time environment for future generations of the ERP system via its architectural structure. This structure may provide 308 application program interfaces 310 of library services for use by patrons of the library. The APIs may operate on resources such as but not limited to forms, tables, records and other data in the database. The APIs may be grouped into categories including but not limited to business logic invocation functions 312, database access functions 315, database administration functions 318, metadata exposure 320 and common data types 322. Other categories may also be possible. An interface 325 to the API library 310 may be provided for library administration purposes, so that the categories of APIs and the contents of the categories may be added to, deleted from, or modified. This interface may be accessed by an administrator, another component of the ERP, another process, or by some other entity. The method 300 may also provide multiple thread access 328 to the library services 310 and security permission checking 330, and then it may end 333.

Figure 4:
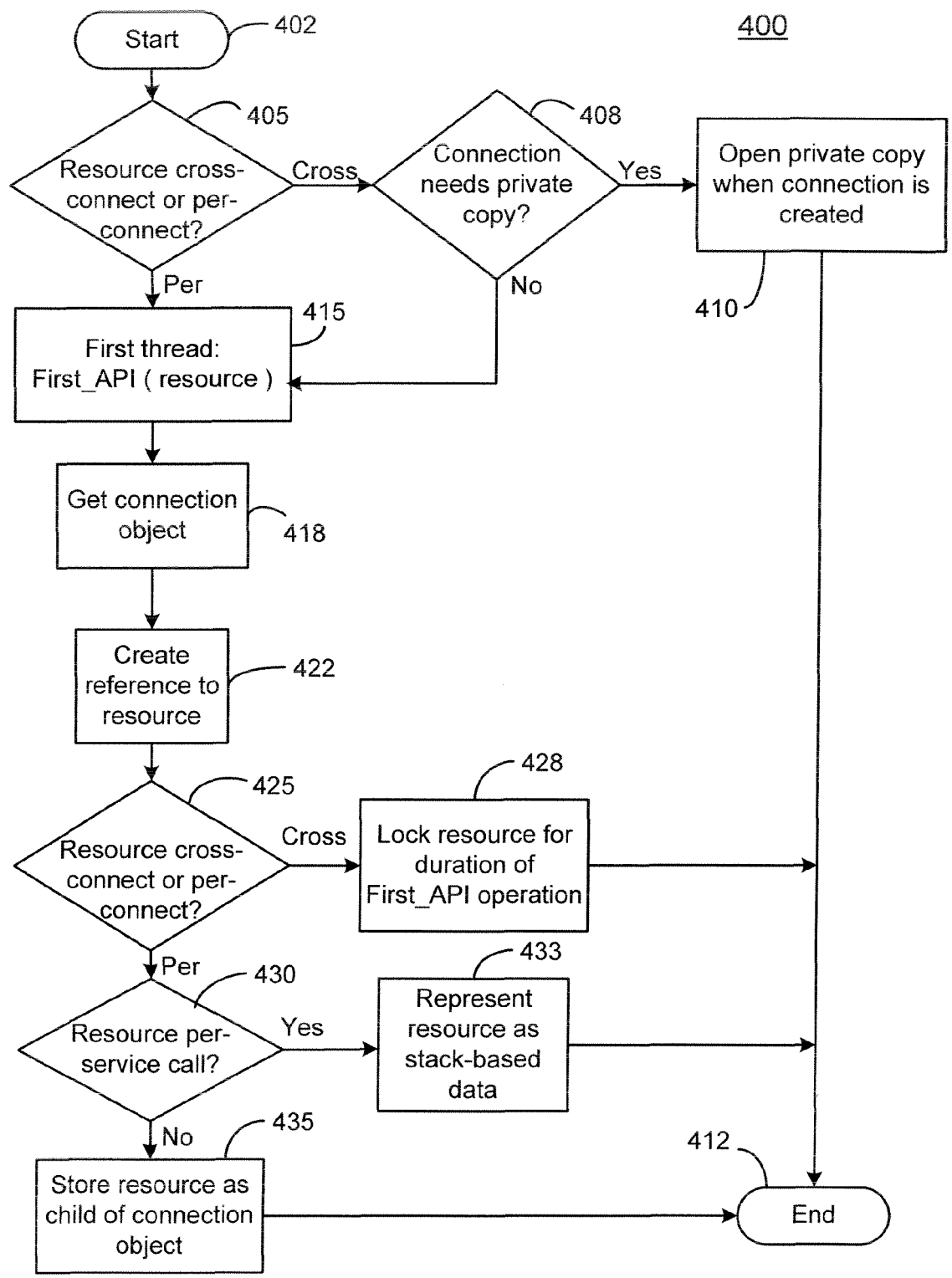
FIG. 4 shows an embodiment of a method for providing multiple thread access to the business programming library.

FIG. 4 illustrates a method 400 for providing multi-threaded access to a business programming library such as library 203 of FIG. 200. At the start 402, resources of the database may be categorized 405 as being cross-connect, i.e., able to be used by multiple live connections, or as per-connect, i.e., able to be used by a single connection for the life of the connection. If a resource is categorized as cross-connect and a connection requires a private copy of the resource 408, a private copy may be opened 410 when the connection is created, and then the method may end 412. Otherwise, in the environs of the business programming library, when a first thread invokes an API to operate on a resource 415, the connection object may be obtained 418, and a reference to the resource may be created 422. This reference may be used throughout the lifetime of a thread to enable quick access to needed resources. If the resource is categorized 425 as cross-connect, the resource is locked for the duration of the API's execution and unlocked when the API has finished 428. If the resource is categorized 425 as per-connect and if it is used on a per-service call basis 430, then the resource may be represented as stack-based data 433. Otherwise, a per-connect, non-per-service call resource may be stored as a child of the connection object 435, and the method may end 412.

Figure 5:
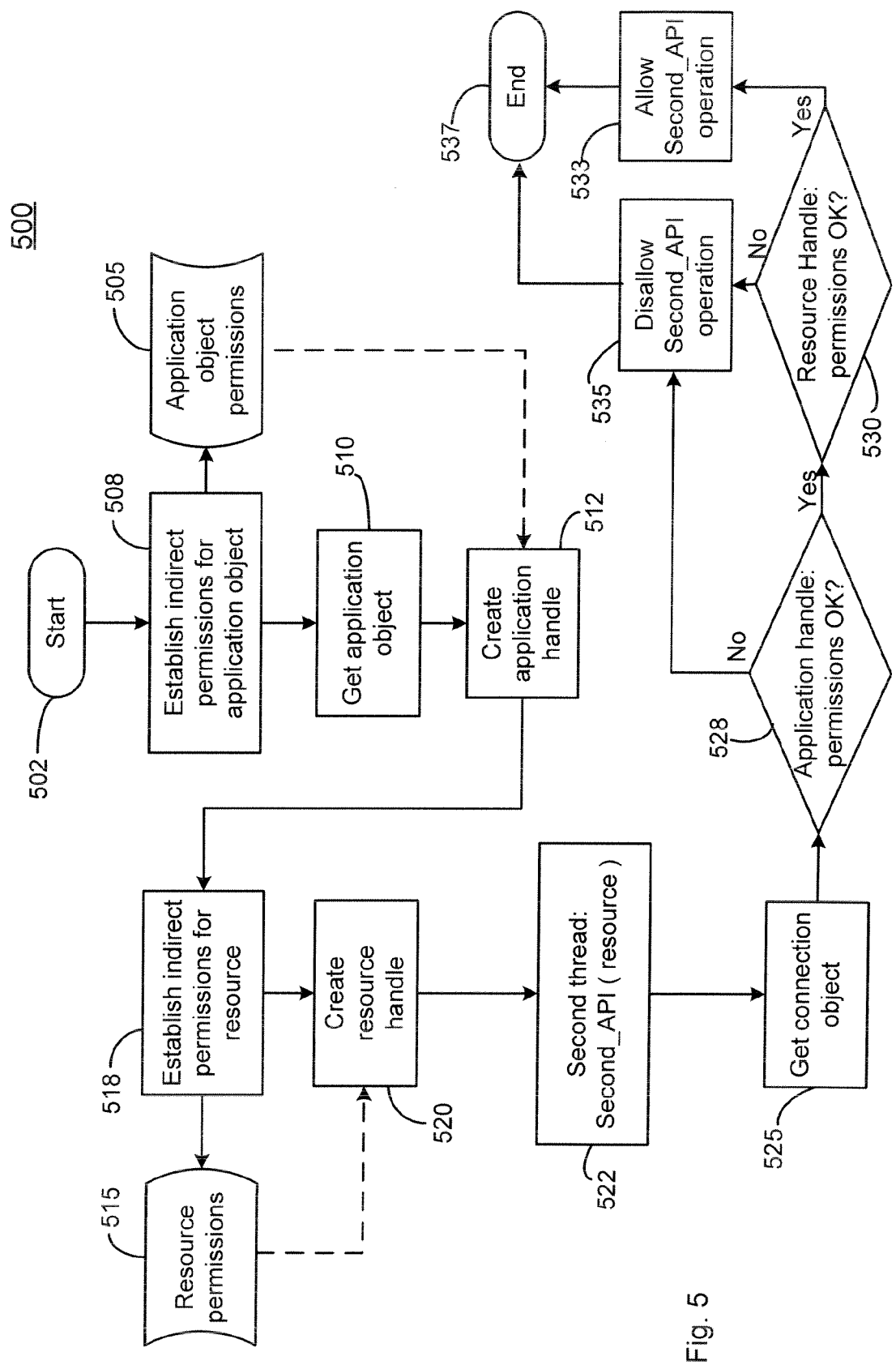
FIG. 5 shows an exemplary method of checking indirect security permissions in the business programming library.

FIG. 5 illustrates a method 500 for checking indirect security permissions by the business programming library. At the start 502, indirect permissions for an application object 505 may be established 508 at run-time. The indirect permissions may be based upon licensing agreements, customer-defined permissions, other sources or some combination thereof. An application object handle corresponding to said application object permissions 505 of the application object 510 may be created 512. Similarly, for a resource, typically but not necessarily a table, indirect permissions 515 may be established 518 at run-time and a resource handle may be created 520 corresponding to said resource permissions. When a object may be obtained 525. If the permissions indicated by the application handle 528 and the permissions indicated by the resource handle 530 both signify allowance, then the API may be allowed to continue its operation 533 on the resource. If one or both permissions indicated by the handles 528, 530 signify denial, then the API may not be allowed to operate on the resource 535 and the method may end 537.

Figure 6:
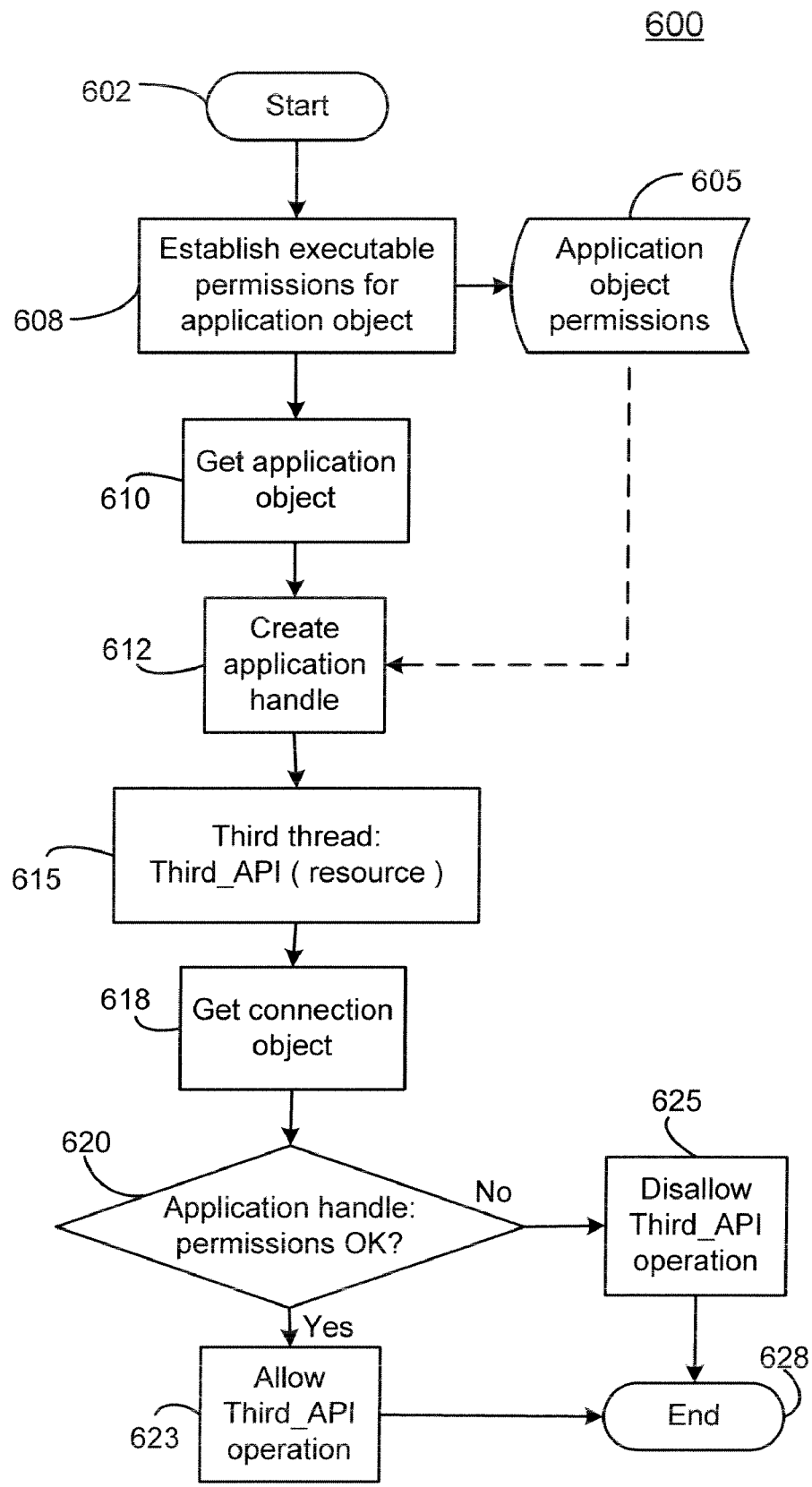
FIG. 6 illustrates an embodiment of a method for checking executable permissions in the business programming library.

FIG. 6 illustrates an exemplary method 600 for checking executable security permissions by the business programming library. At the start 602, executable permissions for an application object 605 may be established 608 at run-time. The executable permissions may be based upon licensing agreements, customer-defined permissions, other sources or some combination thereof. An application handle corresponding to said application object permissions 605 of the application object 610 may be created 612. When a third thread invokes an API to operate on a resource 615, the associated connection object may be obtained 618. If the permissions indicated by the application handle 620 signify allowance, then the API may be allowed to operate 623. Otherwise, the API may be disallowed 625. The exemplary method 600 then may end 628.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed:

1. A method of enabling a business programming library for use by an enterprise resource planning system, the enterprise resource planning system comprising a business application, a metadata provider, a service tier, a database, and a client, the method comprising:
   a) providing a run-time environment to support the enterprise resource planning system,
   b) providing a run-time application program interface (API) for library services comprising:
   providing a set of business logic invocation APIs, comprising providing at least one API corresponding to at least one business method on a class of the enterprise resource planning system, the class comprising one of the group comprising a base class, a table class, and a codeunit class;
   providing a set of database access APIs comprising providing at least one API corresponding to at least one of a group comprising database retrieval, database modification, record insertion, and record deletion;
   providing a set of database administration APIs comprising providing at least one API corresponding to at least one of a group comprising database server configuration, database backup, database restore, database test, and database optimization;

providing a set of metadata exposure APIs comprising providing at least one API corresponding to at least one of a group comprising providing table meta-data and providing form meta-data; and providing a set of common data types comprising at least one API corresponding to at least one member of the set of common data types;

c) providing multiple thread access to the business programming library for a business application object corresponding to at least one of: the business application, the service tier and the metadata provider; and d) providing security permission checking for the business application object and for the service tier comprising providing security permission checking if the run-time API is invoked by the business application object or by the service tier;

wherein providing multiple thread access comprises allocating a resource of the database to a first thread comprising:

categorizing the resource as one of cross-connect and per-connect, if the resource is categorized as cross-connect and a connection of a first client requires a private copy of the resource, creating the private copy if the connection is created, and if a first thread invokes a first run-time API of a first requested library service to operate on the resource:

obtaining a connection object comprising an association between the first thread, the first client and the connection of the first client;

creating a requested reference comprising an association between the resource, the connection object and the first thread;

if the resource is categorized as cross-connect, locking the resource while the first run-time API is operating on the resource and unlocking the resource if the first run-time API is finished operating; and if the resource is categorized as per-connect, selecting one of the group of actions comprising (1) storing the resource as a child of the connection object, and (2) representing the resource as stack-based data if the resource is per-service call.

2. The method of claim 1, wherein the service tier comprises a web service hub of the enterprise resource planning system and the database comprises a relational database.

3. The method of claim 1, further comprising enabling an interface to add, delete, and modify one or more library services and their respective run-time APIs.

4. The method of claim 1, wherein providing multiple thread access comprises providing one or more threads access to one or more run-time APIs of one or more library services in non-sequential fashion.

5. The method of claim 1, wherein providing security permission checking further comprises establishing security permissions corresponding to at least one of the group comprising license permissions and customer-defined permissions.

6. The method of claim 1, wherein providing security permission checking comprises:

establishing indirect permissions at run-time for a resource of the database comprising creating a resource handle comprising a first set of indirect permission data;

establishing indirect permissions at run-time for an application object corresponding to a second business application, comprising creating an application object handle comprising a second set of indirect permission data;

obtaining a connection object comprising an association between a second thread, a second client and a connection of the second client; and if the second thread and the connection of the second client correspond to the second business application:

obtaining the application object, and if the second thread invokes a second run-time API of a second requested library service to access the resource, granting indirect permission if both the application object handle and the resource handle indicate that access is allowed.

7. The method of claim 1, wherein providing security permission checking comprises:

establishing executable permissions at run-time for an application object corresponding to a third business application comprising creating an application object handle comprising a third set of indirect permission data, obtaining a connection object comprising an association between a third thread, a third client and a connection of the third client, and if the third thread and the connection of the third client correspond to the third business application and if the third thread invokes a third run-time API of a third requested library service, granting executable permissions if the application object handle indicates that access is allowed.

8. A method of enabling a business programming library for use by an enterprise resource planning system, the enterprise resource planning system comprising a business application, a metadata provider, a service tier comprising a web service hub of the enterprise resource planning system, a database comprising a relational database, and a client;

the method comprising:

a) providing a run-time environment to support the enterprise resource planning system, b) providing a run-time application program interface (API) for library services comprising:

providing a set of business logic invocation APIs, comprising providing at least one API corresponding to at least one business method on a class of the enterprise resource planning system, the class comprising one of a group comprising a base class, a table class, and a codeunit class;

providing a set of database access APIs comprising providing at least one API corresponding to one of a group comprising database retrieval, database modification, record insertion, and record deletion;

providing a set of database administration APIs comprising providing at least one API corresponding to at least one of a group comprising database server configuration, database backup, database restore, database test, and database optimization;

providing a set of metadata exposure APIs comprising providing at least one API corresponding to at least one of a group comprising providing table meta-data and providing form meta-data; and providing a set of common data types comprising at least one API corresponding to at least one member of the set of common data types;

c) providing multiple thread access to the business programming library for a business application object corresponding to at least one of: the business application, the service tier and the metadata provider, and d) providing security permission checking for the business application object and for the service tier comprising providing security permission checking if the run-time API is invoked by the business application object or by the service tier;

wherein providing multiple thread access comprises:
 a) providing one or more threads access to one or more run-time APIs of one or more library services in non-sequential fashion, and
 b) allocating a resource of the database to a fourth thread comprising:
  categorizing the resource as one of cross-connect and per-connect,
  if the resource is categorized as cross-connect and a connection of a fourth client requires a private copy of the resource, creating the private copy if the connection is created, and
  if a fourth thread invokes a fourth run-time API of a fourth requested library service to operate on the resource:
   obtaining a connection object comprising an association between the fourth thread, the fourth client and the connection of the fourth client;
   creating a requested reference comprising an association between the resource, the connection object and the fourth thread;
   if the resource is categorized as cross-connect, locking the resource while the fourth run-time API is operating on the resource and unlocking the resource if the fourth run-time API is finished operating; and
   if the resource is categorized as per-connect, selecting one of a group of actions comprising 1) storing the resource as a child of the connection object, and 2) representing the resource as stack-based data if the resource is per-service call.

9. The method of claim 8, wherein providing security permission checking comprises:
 providing security permission checking if a fifth run-time API of a fifth requested library service for accessing a table of the database is invoked by a patron application object corresponding to a patron application, the patron application comprising one of the group comprising the business application and the service tier,
 providing security permission checking further comprising:
creating an application object handle corresponding to the patron application object, the application object handle comprising a first set of permission data for the patron application object comprising one of the group comprising indirect and executable permission data; and
 utilizing the application object handle for determining if permission is granted to the patron application object.

10. The method of claim 9, wherein determining if permission is granted to the patron application object comprises determining if one of the group comprising indirect permission and executable permission is granted,
 wherein determining if indirect permission is granted comprises granting indirect permission if the application object handle and a handle of the table comprising a second set of indirect permission data for the table both indicate that access is allowed, and
determining if executable permission is granted comprises granting executable permission if the application object handle indicates that access is allowed.

11. A computer-readable storage medium tangibly embodying a program of instruction executable by a computer for performing steps for enabling a business programming library for use by an enterprise resource planning system, the enterprise resource planning system comprising a business application, a metadata provider, a service tier, a database, and a client, the steps comprising:
 a) providing a run-time environment to support the enterprise resource planning system,
 b) providing a run-time application program interface (API) for library services comprising:
  providing a set of business logic invocation APIs, comprising providing at least one API corresponding to at least one business method on a class of the enterprise resource planning system, the class comprising one of a group comprising a base class, a table class, and a code-unit class;
  providing a set of database access APIs comprising providing at least one API corresponding to one of a group comprising database retrieval, database modification, record insertion, and record deletion;
  providing a set of database administration APIs comprising providing at least one API corresponding to at least one of a group comprising database server configuration, database backup, database restore, database test, and database optimization;
  providing a set of metadata exposure APIs comprising providing at least one API corresponding to at least one of a group comprising providing table meta-data and providing form meta-data; and
  providing a set of common data types comprising at least one API corresponding to at least one member of the set of common data types;
 c) providing multiple thread access to the business programming library for a business application object corresponding to at least one of: the business application, the service tier and the metadata provider, and
 d) providing security permission checking for the business application object and for the service tier comprising providing security permission checking if the run-time API is invoked by the business application object or by the service tier;
 wherein providing multiple thread access comprises allocating a resource of the database to a first thread comprising:
  categorizing the resource as one of cross-connect and per-connect,
  if the resource is categorized as cross-connect and a connection of a first client requires a private copy of the resource, creating the private copy if the connection is created, and
if a first thread invokes a first run-time API of a first requested library service to operate on the resource:
 obtaining a connection object comprising an association between the first thread, the first client and the connection of the first client;
 creating a requested reference comprising an association between the resource, the connection object and the first thread;
 if the resource is categorized as cross-connect, locking the resource while the first run-time API is operating on the resource and unlocking the resource if the first run-time API is finished operating; and
 if the resource is categorized as per-connect, selecting one of a group of actions comprising 1) storing the resource as a child of the connection object, and 2) representing the resource as stack-based data if the resource is per-service call.

12. The computer-readable storage medium of claim 11, wherein the service tier comprises a web service hub of the enterprise resource planning system and the database comprises a relational database.

13. The computer-readable storage medium of claim 11, further comprising enabling an interface to add, delete, and modify one or more library services and their respective run-time APIs.

14. The computer-readable storage medium of claim 11, wherein providing multiple thread access comprises providing one or more threads access to one or more run-time APIs of one or more library services in non-sequential fashion.

15. The computer-readable storage medium of claim 11, wherein providing security permission checking comprises establishing security permissions corresponding to one of the group comprising license permissions and customer-defined permissions.

16. The computer-readable storage medium of claim 11, wherein providing security permission checking comprises:
- establishing indirect permissions at run-time for a resource of the database comprising creating a resource handle comprising a first set of indirect permission data;
- establishing indirect permissions at run-time for an application object corresponding to a second business application, comprising creating an application object handle comprising a second set of indirect permission data;
- obtaining a connection object comprising an association between a second thread, a second client and a connection of the second client; and
- if the second thread and the connection of the second client correspond to the second business application:
  - obtaining the application object, and if the second thread invokes a second run-time API of a second requested library service to access the resource, granting indirect permission if both the application object handle and the resource handle indicate that access is allowed.

17. The computer-readable storage medium of claim 11, wherein providing security permission checking comprises: establishing executable permissions at run-time for an application object corresponding to a third business application comprising creating an application object handle comprising a third set of indirect permission data, obtaining a connection object comprising an association between a third thread, a third client and a connection of the third client, and
- if the third thread and the connection of the third client correspond to the third business application and if the third thread invokes a third run-time API of a third requested library service, granting executable permissions if the application object handle indicates that access is allowed.

* * * * *